US011410083B2

(12) United States Patent
Vasudevan et al.

(10) Patent No.: US 11,410,083 B2
(45) Date of Patent: Aug. 9, 2022

(54) DETERMINING OPERATING RANGE OF HYPERPARAMETERS

(71) Applicant: International Business Machines Corporation, Armonk, NY (US)

(72) Inventors: Shrihari Vasudevan, Chennai (IN); Alind Khare, Atlanta, GA (US); Koyel Mukherjee, Bangalore (IN); Yogish Sabharwal, Gurgaon (IN); Ashish Verma, Nanuet, NY (US)

(73) Assignee: International Business Machines Corporation, Armonk, NY (US)

(*) Notice: Subject to any disclaimer, the term of this patent is extended or adjusted under 35 U.S.C. 154(b) by 460 days.

(21) Appl. No.: 16/736,225

(22) Filed: Jan. 7, 2020

(65) Prior Publication Data
US 2021/0209502 A1    Jul. 8, 2021

(51) Int. Cl.
*G06N 20/00* (2019.01)
*G06K 9/62* (2022.01)

(52) U.S. Cl.
CPC .......... *G06N 20/00* (2019.01); *G06K 9/6262* (2013.01); *G06K 9/6289* (2013.01)

(58) Field of Classification Search
CPC ...... G06N 20/00; G06N 5/003; G06K 9/6262; G06K 9/6289
See application file for complete search history.

(56) References Cited

U.S. PATENT DOCUMENTS

| 5,398,302 A | 3/1995 | Thrift |
| 6,269,351 B1 | 7/2001 | Black |
| 10,685,286 B1* | 6/2020 | McDonnell ............ G06N 3/086 |
| 2016/0132787 A1 | 5/2016 | Drevo et al. |
| 2017/0228645 A1 | 8/2017 | Wang et al. |
| 2019/0095794 A1 | 3/2019 | Aldana Lopez |
| 2020/0160118 A1* | 5/2020 | Kageyama ............ G06N 3/084 |
| 2020/0175354 A1* | 6/2020 | Volodarskiy ............. G06N 3/08 |
| 2020/0372342 A1* | 11/2020 | Nair ...................... G06N 3/0454 |
| 2020/0387798 A1* | 12/2020 | Hewage ................... G06N 3/08 |

(Continued)

FOREIGN PATENT DOCUMENTS

CN    109978134    7/2019

OTHER PUBLICATIONS

Smith LN. Cyclical learning rates for training neural networks. 2017 IEEE Winter Conference on Applications of Computer Vision (WACV) Mar. 24, 2017 (pp. 464-472).

(Continued)

*Primary Examiner* — Lewis G West
(74) *Attorney, Agent, or Firm* — Ryan, Mason & Lewis, LLP (57) ABSTRACT

Methods, systems, and computer program products for determining operating range of hyperparameters are provided herein. A computer-implemented method includes obtaining a machine learning model, a list of candidate values for a hyperparameter, and a dataset; performing one or more hyperparameter range trials based on the machine learning model, the list of candidate values for the hyperparameter, and the dataset; automatically determining an operating range of the hyperparameter based on the one or more hyperparameter range trials; and training the machine learning model to convergence based at least in part on the determined operating range.

20 Claims, 8 Drawing Sheets

(56) References Cited

U.S. PATENT DOCUMENTS

| | | | | |
|---|---|---|---|---|
| 2021/0406695 A1* | 12/2021 | Pandarinath | ............ | G06N 3/084 |
| 2022/0109853 A1* | 4/2022 | Zhang | ................. | H04N 19/147 |
| 2022/0148245 A1* | 5/2022 | Szarzynski | .......... | B25J 11/0005 |
| 2022/0156518 A1* | 5/2022 | Jiang | .................... | G06V 10/443 |

OTHER PUBLICATIONS

Smith LN. A disciplined approach to neural network hyper-parameters: Part 1—learning rate, batch size, momentum, and weight decay. arXiv preprint arXiv:1803.09820. Mar. 26, 2018.

Smith LN, Topin N. Super-convergence: Very fast training of neural networks using large learning rates. Artificial Intelligence and Machine Learning for Multi-Domain Operations Applications May 10, 2019 (vol. 11006, p. 1100612). International Society for Optics and Photonics.

Fastai Library https://github.com/fastai/fastai (accessed on Dec. 30, 2019).

Ruder S. An overview of gradient descent optimization algorithms. arXiv preprint arXiv:1609.04747. Sep. 15, 2016.

Schaul T, Zhang S, LeCun Y. No more pesky learning rates International Conference on Machine Learning Feb. 13, 2013 (pp. 343-351).

Gulcehre C, Sotelo J, Moczulski M, Bengio Y. A robust adaptive stochastic gradient method for deep learning. 2017 International Joint Conference on Neural Networks (IJCNN) May 14, 2017 (pp. 125-132).

Scikit-Learn GridSearchCV, https://scikit-learn.org/stable/modules/generated/sklearn.model_selection.GridSearchCV.html, accessed on Dec. 30, 2019.

Golovin D, Solnik B, Moitra S, Kochanski G, Karra J, Sculley D. Google vizier: A service for black-box optimization. Proceedings of the 23rd ACM SIGKDD International Conference on Knowledge Discovery and Data Mining Aug. 13, 2017 (pp. 1487-1495). ACM.

H2O AutoML, http://docs.h2o.ai/h2o/latest-stable/h2o-docs/automl.html, (accessed on Dec. 30, 2019).

Feurer M, Klein A, Eggensperger K, Springenberg J, Blum M, Hutter F. Efficient and robust automated machine learning. Advances in neural information processing systems 2015 (pp. 2962-2970).

Kotthoff L, Thornton C, Hoos HH, Hutter F, Leyton-Brown K. Auto-WEKA 2.0: Automatic model selection and hyperparameter optimization in WEKA. The Journal of Machine Learning Research. Jan. 1, 2017;18(1):826-30.

Yang C, Akimoto Y, Kim DW, Udell M. Oboe: Collaborative filtering for automl initialization. arXiv preprint arXiv:1808.03233. Aug. 2018.

B. Komer et al., "Hyperopt-sklearn: automatic hyperparameter configuration for scikit-learn", ICML workshop on AutoML 2014.

Bergstra J, Yamins D, Cox DD. Hyperopt: A python library for optimizing the hyperparameters of machine learning algorithms. InProceedings of the 12th Python in science conference Jun. 2013 (pp. 13-20).

You Y, Gitman I, Ginsburg B. Large batch training of convolutional networks. arXiv preprint arXiv:1708.03888. Aug. 13, 2017.

\* cited by examiner

DETERMINING OPERATING RANGE OF
HYPERPARAMETERS

BACKGROUND

The present application generally relates to information technology and, more particularly, to machine learning.

In general, machine learning refers to the process in which a system or program builds (or trains) a model from input data. Once trained, the machine learning model may be used to, for example, make predictions from new data. Training a machine learning model includes obtaining a prediction based on the current state of the model, determining how incorrect the prediction is, and updating the weights or parameters of the model to minimize this error. This process is repeated until the model has converged.

Generally, hyperparameters refer to the parameters that control the subsequent learning process. Hyperparameters do not specify the model parameters directly but rather specify parameters of the learning process, which, when executed, results in tuning the model parameters over successive training iterations A key hyperparameter is the learning rate parameter, which is used to train a model, for example, via Gradient Descent. During each training iteration, the Gradient Descent algorithm multiplies the gradient by the learning rate.

SUMMARY

In one embodiment of the present invention, techniques for determining an operating range for the learning rate hyperparameter are provided. An exemplary computer-implemented method includes obtaining (i) a machine learning model, (ii) a list of candidate values for a hyperparameter, and (iii) a dataset, and performing one or more hyperparameter range trials. Performing a given one of the hyperparameter range trials includes: training, based on a given one of the candidate values, the machine learning model for one or more epochs from an initial model state using the dataset. Also, when the training is successful for the given candidate value, performing the given one of the hyperparameter range trials includes: recording one or more performance metrics for each of the one or more epochs of training; training, based on one or more additional candidate values in the list, the machine learning model from the same initial model state; and recording, in connection with the training based on the one or more additional candidate values, the one or more performance metrics. The method also includes automatically determining, based on the one or more performance metrics from the one or more hyperparameter range trials, an operating range for the hyperparameter; and training the machine learning model to convergence based at least in part on the operating range Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform the noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Selecting the appropriate setting for the learning rate (such as, for example, when training deep neural networks) is critical for successful ML models. Some adaptive learning rate techniques exist; however, such techniques generally require parameter tuning in complex model and/or dataset scenarios.

By way of example, automated model synthesizer (AMS) systems (such as, for example, IBM NeuNetS) ingest a dataset for training. Learning rates (LRs) are generally set to default values in accordance with the underlying algorithms. One existing technique proposes a LR Range Test that incrementally increases the LR over successive epochs and manually fixes the LR operating range as the range within which there is maximum (training) accuracy growth. The LR for different optimization algorithms are otherwise set experimentally, such as through a trial and error approach or based on a grid-search over a small set of LRs that are chosen for a specific dataset and/or model. It is noted that this technique: occurs within a single run of the algorithm; does not consider repeatability or fair testing; cannot isolate performance of an individual LR; does not provide layer-wise operating ranges; and typically involves a manual step of visually picking the LR range. Exemplary embodiments described herein provide improvements on these aspects.

It is also noted that existing adaptive LR techniques work with default settings (of their parameters) to adaptively set the LR every epoch, based on gradients. These adaptive LR techniques specify a different LR for every training epoch (i.e., the number of iterations required to pass over the training data once) and for each parameter. To do this, these techniques have many parameters, which are typically set to their default values. However, in practice, one or more of these parameters are often required to be tuned for complex data/model combinations. Although tuning the default settings can help improve outcome, there is no native way (other than trial and error) of finding an operating range for their parameters.

The exemplary embodiments herein describe improved techniques for determining an operating range for the LR hyperparameter. One or more example embodiments are based on a Stochastic Gradient Descent (SGD) approach to model training (or variants thereof, such as, for example, SGD with restarts (SGDR), cyclical learning rate (CLR), Momentum, and Nesterov), and training approaches based on it (such as Dynamic LR using mutual information (DyLR-MI) and Binary Exploration (BE), for example). Exemplary embodiments described herein provide techniques for identifying an operating range for the LR.

As described herein, an embodiment of the present invention includes fair testing of each test (or candidate) LR from the same initial model state and for the same number of epochs. According to some embodiments, repeatability is efficiently achieved through a multi-trial (within a single run) approach where each trial builds on the previous outcome. A plurality of metrics may be used to determine LR operating range. For example, the plurality of metrics may be combined into a single metric to determine the LR operating range. As another example, the operating ranges may be determined for each metric independently and these operating ranges may be combined into a single operating range. In at least one example, an LR operating range and significance thresholds for individual metrics may be provided. Exemplary embodiments may be adapted to capture layer-wise metrics and thereby specify a layer-wise LR operating range. Exemplary embodiments described herein are useful for a range of different LR training algorithms.

One example embodiment includes providing a fully-automated LR range test. The LR range test is applicable across datasets and models. The LR range test tests each potential LR for a fixed duration (e.g., predetermined number of epochs), and then selects an LR operating range using one or more metrics. The proposed LR range test can provide an LR operating range for existing optimization techniques and can also provide other related characteristics which may be used by certain adaptive LR algorithms such as, for example, (1) LR with maximum accuracy and (2) significance thresholds based on different metrics.

Although techniques described herein are generally described with reference to the LR hyperparameter, those skilled in the art will appreciate that such techniques are also applicable to estimate operating ranges of other hyperparameters, such as, for example, a Batch-Size hyperparameter in a broader dynamic hyper-parameter learning context.

Figure 1:
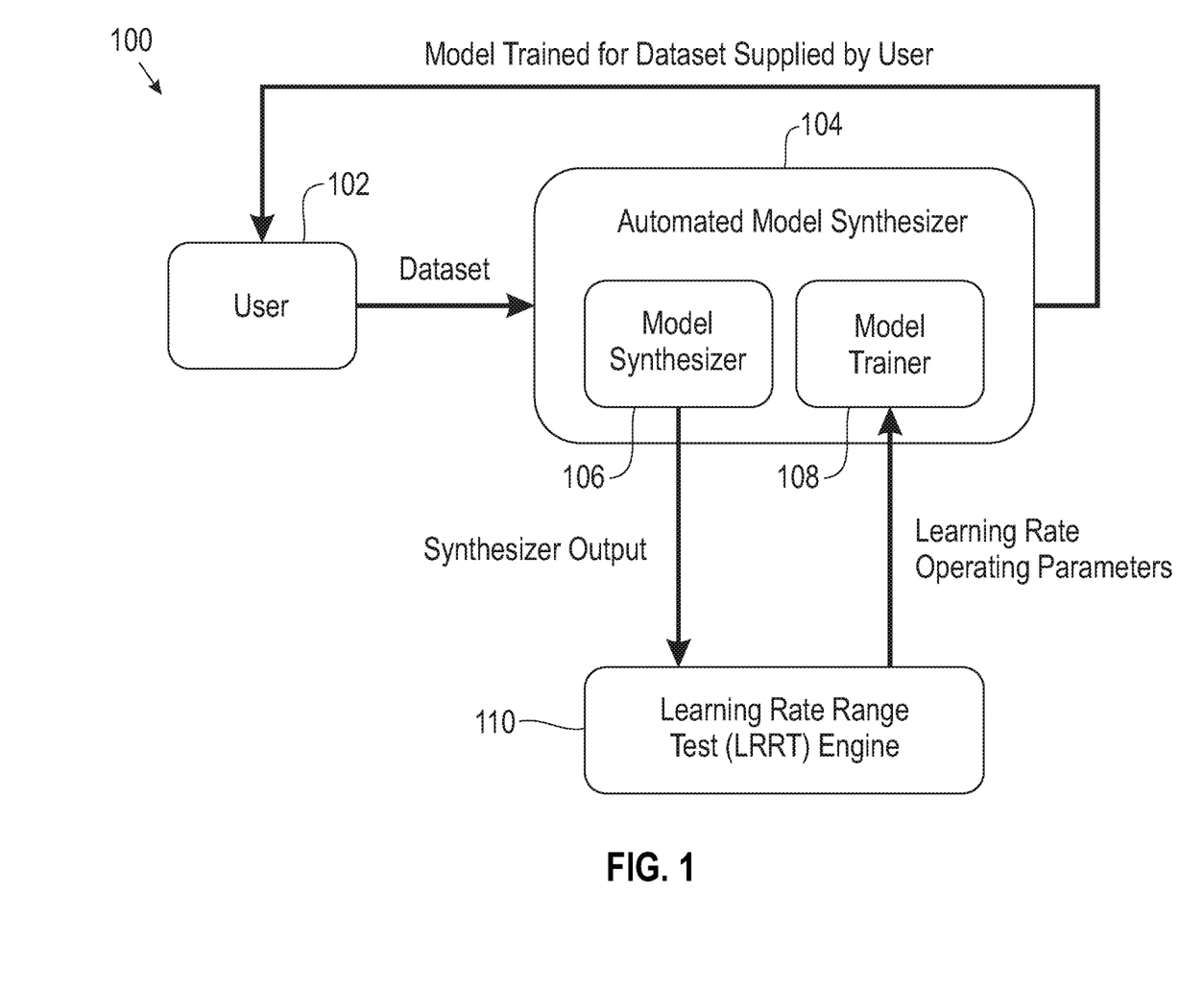
FIG. 1 is a diagram illustrating system architecture according to an exemplary embodiment.

Turning now to FIG. 1, this figure illustrates a system architecture 100 in accordance with exemplary embodiments. By way of illustration, FIG. 1 depicts an automated model synthesizer (AMS) 104, which includes a model synthesizer 106 and a model trainer 108, and a learning rate range test (LRRT) engine 110. The AMS 104 obtains a dataset from a user 102. The model synthesizer 106 proposes a ML model for the dataset. The LRRT engine 110 generates an LR operating range for the synthesized ML model and the given data. The LR operating range may be generated based on, for example, the following inputs: an LR test range (for example, a list or array of candidate LRs to be tested), a number of epochs, and a number of LR range trials. It is noted that a given LR range test includes multiple LR range trials, wherein each trial tests one or more LRs from the same initial model state, for the same number of epochs. The model trainer 108 trains the ML model proposed by the model synthesizer 106 based on the LR operating range recommended by the LRRT engine 110, the model provided by the synthesizer 106 and the dataset supplied by the user.

The number of epochs and the number LR range trials may be based on the complexity of the model and dataset. For example, the number of epochs for a simple model/dataset combination may be less than the number of epochs required for a complex model/dataset combination. The number of LR range trials and epochs may also be set to balance time constraints and confidence of the recommended operating range (e.g., a larger number of LR range trials generally results in higher confidence of the operating range but also increases the time required).

Figure 2A:
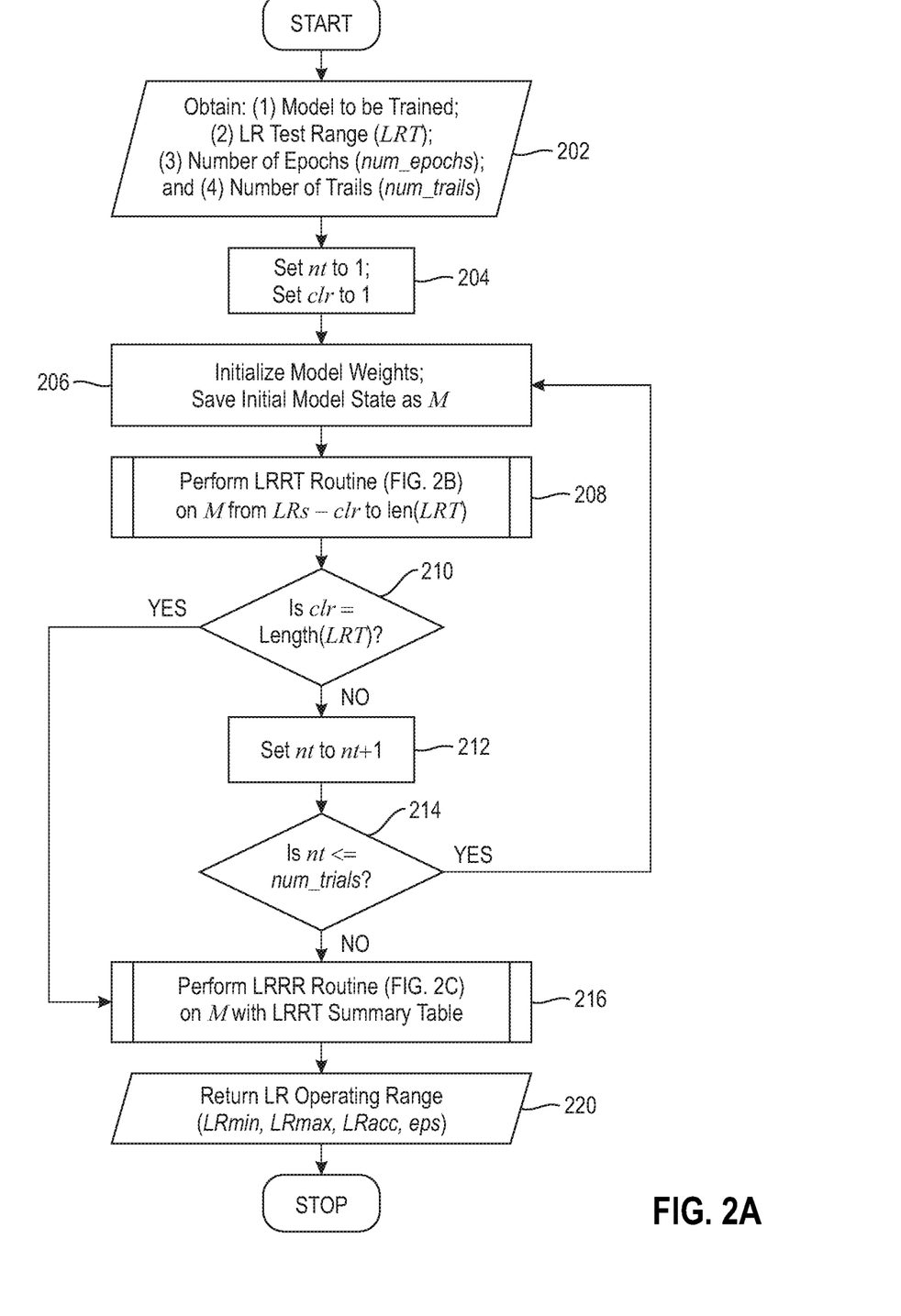
FIGS. 2A-2C are flow diagrams of processes in accordance with exemplary embodiments.
Figure 2B:
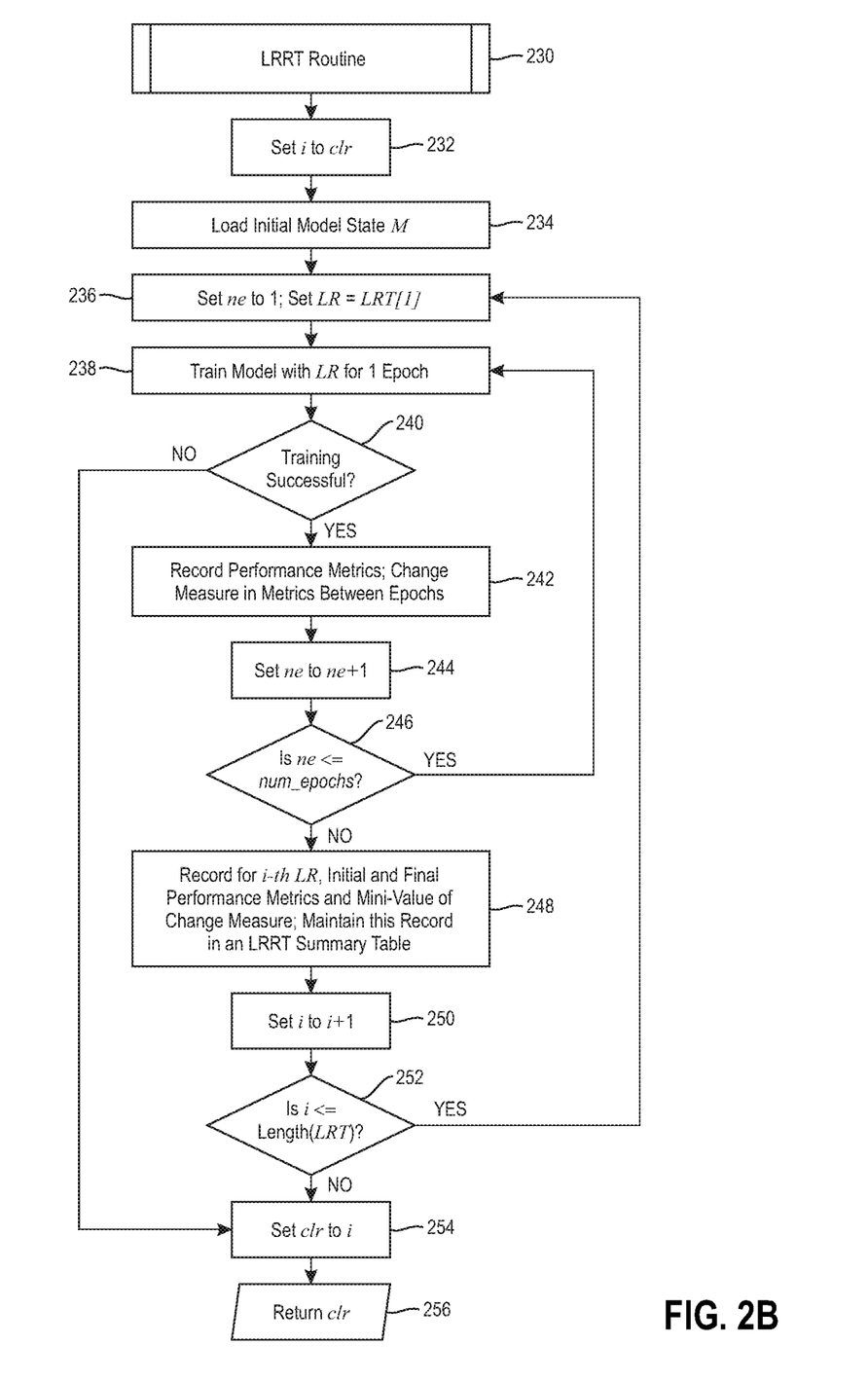
Figure 2C:
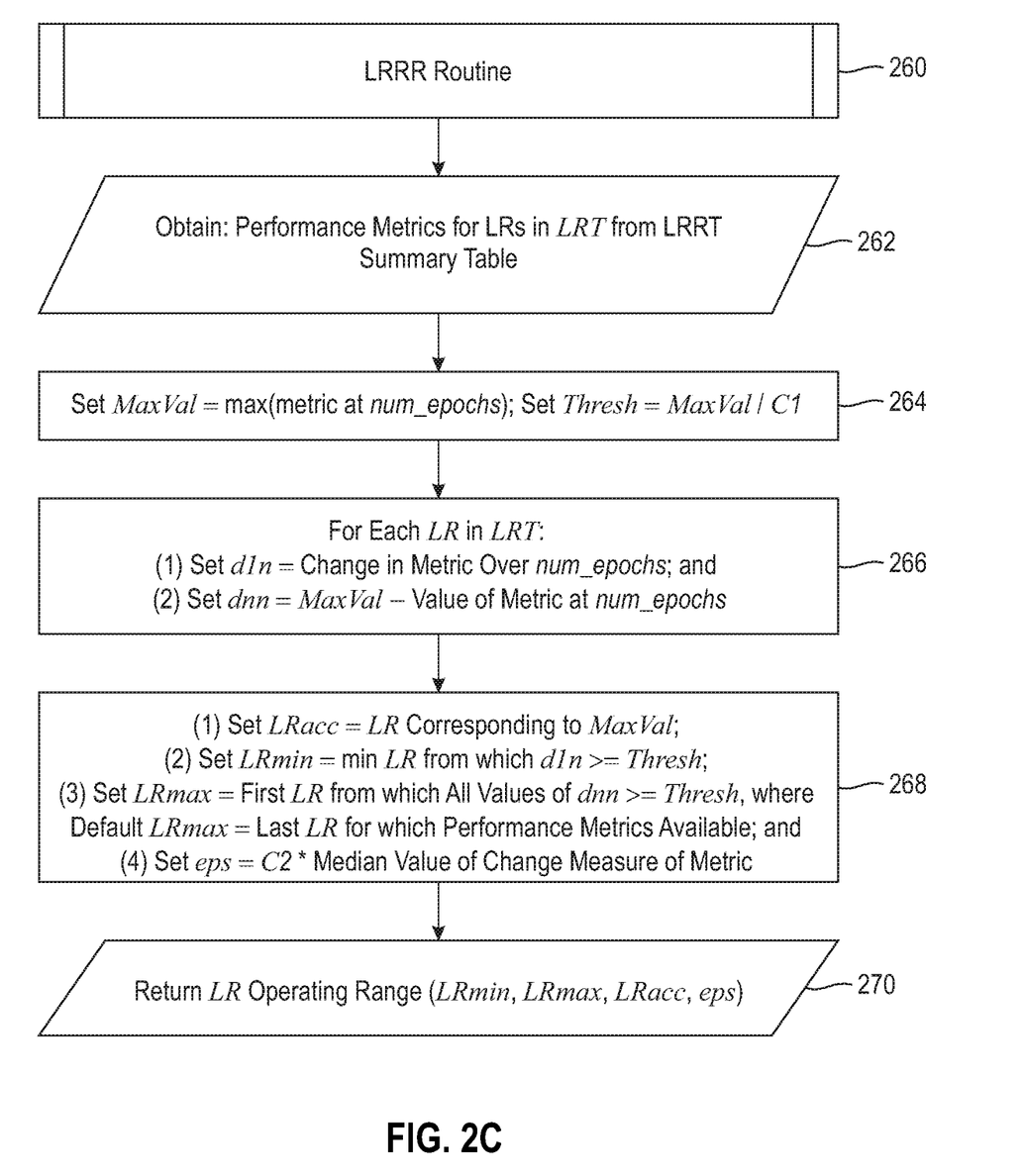

FIGS. 2A-2C are flow diagrams of processes in accordance with exemplary embodiments. Referring to FIG. 2A, step 202 includes obtaining (1) a machine learning model to be trained; (2) an LR test range (LRT); (3) a number of epochs; and (4) a number of trials. At step 204, the variables nt and dr are each assigned a value of 1. At step 206, model weights of the model obtained at step 202 are initialized. The initial model state for the current trial, specified by nt, is saved as M. At step 208, the LRRT Routine (as further detailed below in conjunction with FIG. 2B) is performed on M from LRs—dr to length (LRT). At step 210, a check is performed to determine whether dr is equal to length (LRT). In other words, step 210 checks if all of the LRs in the test range have been successfully tested. If yes, then the process flow continues to step 216. Step 216 performs the LR range recommendation (LRRR) routine on M with the LRRT summary table as discussed in more detail below with reference to FIG. 2C. Step 220 then returns the LR operating range. The LR operating range may be indicated using determined values for LRMin, LRmax, LRacc, and EPS. It is noted that EPS is a significance threshold (i.e., a threshold indicating whether a value change of a metric is significant). As an example, EPS is based on relative change of a mutual information metric for the DyLR-MI approach. If clr is not equal to length (LRT) at step 210, then process flow continues to step 212, which increments the variable nt. Step 214 checks whether nt is less than or equal to number of trials (num_trials). If yes, then process flow returns to step 206. If no, then process flow continues to step 216, which is performed as indicated above. Accordingly, dr may be considered an index of the range of testable LRs, and nt may be considered an index over the number of trials permitted. The testing is performed until either all candidate LRs have been successfully tested or the number of trials has been exceeded, whichever is earlier.

Referring now to FIG. 2B, this figure shows a process corresponding to the LRRT routine 230 in accordance with an exemplary embodiment. The LRRT routine 230 is passed the value of variable clr from step 208 of FIG. 2B. At Step 232, a variable i is assigned the value of clr. The initial model state M is loaded at step 234. Step 236 sets variable ne to 1, and sets the learning rate to the value in the i-th position of the LRT range. At step 238, the model is trained using the LR for one epoch. Step 240 checks whether the training was successful. If the training is unsuccessful, then the process continues to step 254, which sets the value of dr to the value of i. The value of dr is returned at step 256. Accordingly, step 256 may indicate that that the current trial is over (or cannot progress any further). The next trial re-initializes the model state and starts testing from the LR where the previous trial stopped. All LRs in a given trial will use the same model state.

It is noted that each time the LRRT routine 230 is called it tests the ML model over any remaining candidate LRs, as indicated by the variable clr. Also, it is noted that the initial model state is saved at the beginning of each trial. Thus, for each call of LRRT routine 230, the currently saved initial model state (i.e., M) is used to initialize the model to the same state as other candidate LRs in the current trial.

If the training is successful at step 240, then process flow continues to step 242. Step 242 includes recording performance metrics, and one or more measures of change in the metrics between epochs. Those skilled in the art will appreciate that training is generally considered 'successful' when it is determined that the training has not crashed. Indications that the training crashed may include, for example, a sudden fall of one or more metrics, one or more metrics remaining relatively flat at a low-value, or another such criterion. The number of epochs to be performed is generally greater than one, in which case the determination of whether the testing is successful is based at least in part on the change in one or more of the performance metrics over multiple epochs of training. It is to be appreciated that the number of epochs to be performed may also be equal to one, in which case the determination of whether the testing is successful may be based on the change in the performance metric(s) between the single epoch of training and defaults value(s) of the performance metric(s) obtainable prior to training. For example, the default values may be obtained by computing performance using the initial values of the model parameters; typically these are initialized to random values.

Step 244 increments the variable ne, and a check is performed at step 246 to determine whether the value of ne<=to the number of epochs (num-epochs). If so, then process flow returns to step 238. Otherwise, step 248 is performed, which includes recording, for the LR indicated in the i-th position of the LRT range, initial and final performance metrics and the minimum value (min-val) of the change measure. Step 248 maintains this record in an LRRT summary table. Next, step 250 increments i, and the value of i is compared to the length (LRT) at step 252. If i is less than or equal to the length (LRT), then process flow returns to step 236; otherwise the process flow continues to step 252.

Referring now to FIG. 2C, this figure shows a process corresponding to an LRRR routine 260 in accordance with an exemplary embodiment. The LRRR routine 260 obtains the performance metrics for the LRs in the LRT range from the LRRT summary table (as maintained by the LRRT routine 230) at step 262. Step 264 sets the variable MaxVal to the maximum of the metric at num_epochs, and sets the variable Thresh to MaxVal/C1, where C1 is a constant. As non-limiting examples the value of C1 may be set to 5, 10, or 30, depending on the particular case. Step 266 includes, for each LR in LRT, (1) setting d1n to a change in the metric over num_epochs, and (2) setting dnn to MaxVal−the value of the metric at num_epochs. At step 268 the following operations are performed: (1) set LRacc to the LR corresponding to MaxVal; (2) set the LRmin to the minimum LR from which d1n>=Thresh; (3) set LRmax to the first LR from which all values of dnn>=Thresh, wherein the default LRmax is equal to the last LR for which performance metrics are available; and (4) set EPS=C2*median value of change measure of the performance metric, wherein C2 is a constant that depends on the dataset in use. For example, for DyLR-MI, C2 may be set to 1, but may also be set to other values depending on the use case. As an example, a dataset that trains very quickly, a value of 0.01 or 0.0005 for C2 may be used to obtain better performance.

The LRRR routine 260 then returns the LR operating range at step 270, which in this example, is done based one the values for LRMin, LRmax, LRacc, and EPS.

By way of example, consider a list of ten candidate learning rates that are to be tested. For a simple model, all ten of these learning rates may be successfully tested in a single trial. For a complex model, multiple trials may be required to successfully test the ten candidate learning rates. For example, a first trial may successfully test learning rate candidates 1 through 7 before the training crashes. In this example, a second trial is started (with a new initial model state), to test the remaining candidates, i.e., candidate 8 through 10). This may be performed until the number of trials has been surpassed or all candidates have been tested, whichever is earlier. During each of these trials one or more performance metrics are recorded. Then, the operating range may be determined, and the model may be trained.

According to one or more example embodiments, the performance metrics may include one or more of: training loss, training accuracy, a mutual information (MI) metric, etc. The change in the performance metric may be recorded between epochs for any subset of the metrics being recorded. For example, if the Dynamic LR using MI (DyLR-MI) algorithm for model training is used, then the relative change in MI metric between epochs would be recorded. This is the case as the EPS significance threshold is based on the MI metric. Similar significance thresholds may also be computed for any other performance metric that is used, as required by the optimization algorithm in consideration.

At least one example embodiment includes performing the LRRR routine 260 on each metric separately, and integrating their results through a suitable function (such as, for example, union, intersection, etc.). In some example embodiments, the LRRR routine 260 may also be performed on a subset (i.e., one or more) of the metrics being recorded or a composite metric (a function of the metrics). As non-limiting examples, an LR operating range may be recommended using one of: (a) training accuracy only; (b) training accuracy and an MI metric, in which case the resulting recommendations can then be combined; and (c) a function of the training accuracy and MI metric, which would result in a single LR range recommendation.

The LR test range window and/or resolution may be suitably selected based on one or more of: dataset complexity, model complexity, and/or resource constraints (e.g., time). By way of example: if the objective is generalized automation across models/datasets without resource constraints, then a fine resolution LR test range can be used; and if there are resource constraints and/or broad LR bounds suffice, then a coarser resolution LR test range can be adopted.

According to at least one example embodiment, multi-stage LR testing is performed. As an example, a coarse LR test set may be followed by a fine LR test set around one (or a contiguous set) of the LRs of the coarse set. As another example, a gradually finer sampling and testing of half the range of an initially coarse test LR range may be performed.

In FIG. 2C, the Thresh variable is fixed based on MaxVal, however, this threshold may also be computed based on different factors in different embodiments. For example, Thresh may be set using the d1n and/or dnn variables.

According to one example embodiment, one performance metric may be used for a subset of the parameters, e.g., LRMIN/LRMAX/LRACC, and another metric may be used for another subset of the parameters, e.g., EPS. This depends on the requirements of the optimization algorithm to be subsequently used. Embodiments of the invention may use other measures to determine EPS (e.g., instead of median, the EPS may be determined based on percentiles or min/max values).

It is also to be appreciated that different model training/optimization algorithms may use different subsets of the LR operating range (LRMIN, LRMAX, LRACC, EPS). As an example, an optimization algorithm requiring only an LR upper bound can use only LRMAX, whereas DyLR-MI may use 3 or 4 of the parameters depending on whether the initial LR is set using LRACC or not.

According to one example embodiment, it is possible to design a criterion (e.g., one or more rules) for stopping the LRRT early. For example, one possible criterion is determining repeated occurrences of the same operating range over multiple trials, in which case the LRRR routine is run after each trial. As another example, if multiple trials are unable to progress, the process could be stopped.

An example embodiment may also include running the test multiple times and automatically selecting one of the LR operating range recommendations (e.g., based on a predefined criterion).

Additionally, it is noted that the number of trials and number of epochs may each be greater than or equal to one. Each of these variables may be set based on prior knowledge of the model complexity, data complexity, and/or resource constraints (e.g., time available).

The processes described with reference to FIGS. 2A-2C may also be adapted to capture layer-wise metrics (e.g., MI between layer-wise outcomes and true output). As such, one or more example embodiments may specify an operating range for the LR for each layer individually.

Figure 3:
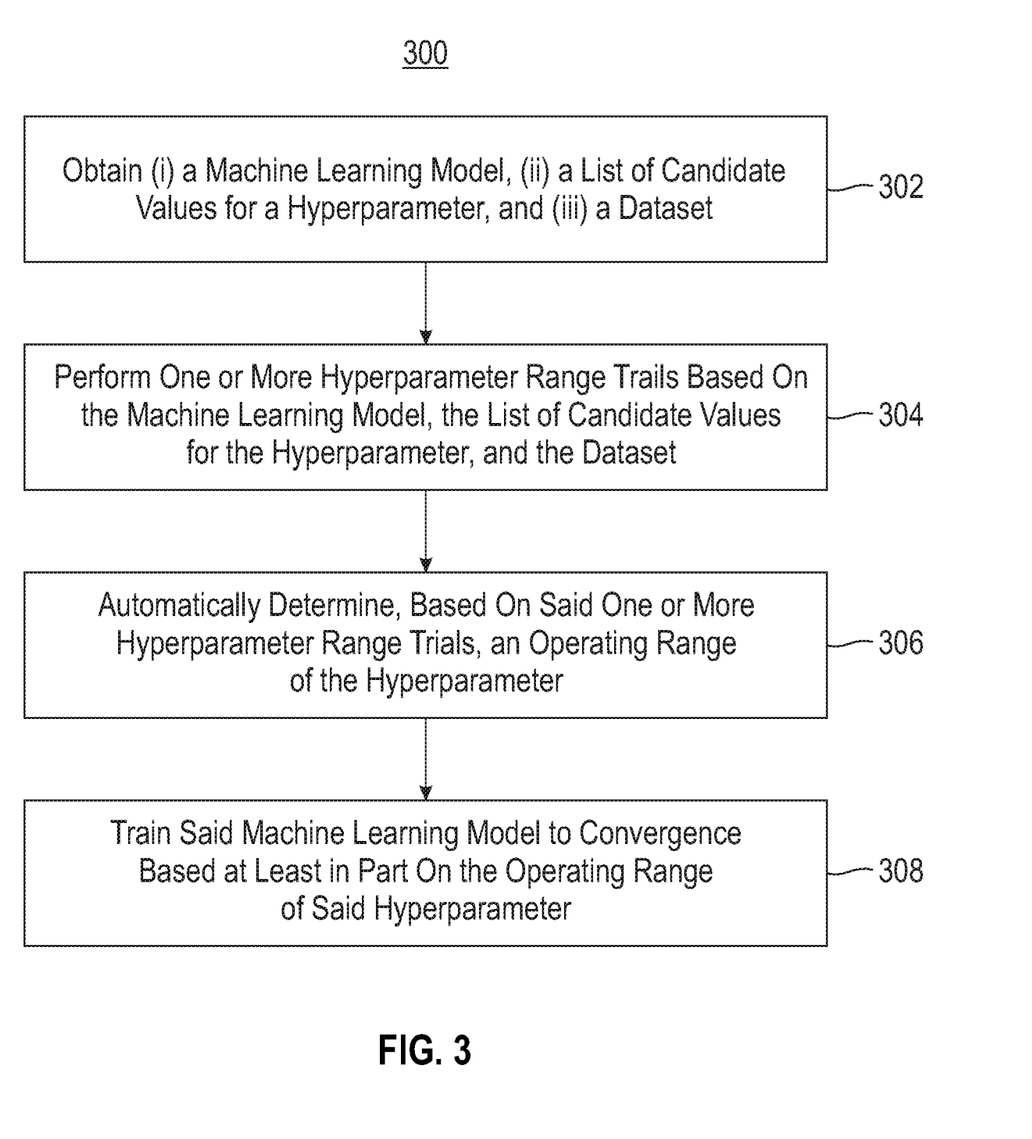
FIG. 3 is a flow diagram illustrating techniques in accordance with exemplary embodiments.

FIG. 3 is a flow diagram of a process 300 according to an embodiment of the present invention. Step 302 includes obtaining (i) a machine learning model, (ii) a list of candidate values for a hyperparameter, and (iii) a dataset.

Step 304 includes performing one or more hyperparameter range trials. Performing a given one of the hyperparameter range trials includes: training, based on a given one of the candidate values, the machine learning model for one or more epochs from an initial model state using the dataset. When the training is successful for the given candidate value, performing the given hyperparameter range trial includes: recording one or more performance metrics for each of the one or more epochs of training; training, based on one or more additional candidate values in the list, the machine learning model from the same initial model state; and recording, in connection with the training based on the one or more additional candidate values, the one or more performance metrics.

Step 306 includes automatically determining, based on the one or more performance metrics from the one or more hyperparameter range trials, an operating range for the hyperparameter.

Step 308 includes training the machine learning model to convergence based at least in part on the operating range.

Performing a given one of the one or more hyperparameter range trials may include, when the training is unsuccessful for the given candidate value, causing one or more additional ones of the hyperparameter range trials to be performed until at least one of: (i) a predefined maximum number of hyperparameter range trials are performed and (ii) each candidate value in the list is used to successfully train the machine learning model.

Each of the additional hyperparameter range trials may be performed starting with the candidate value for which training was unsuccessful in the previous hyperparameter range trial. The process 300 may include independently determining the initial model state at the start of each of the one or more hyperparameter range trials. The operating range may correspond to at least one of: (i) an individual layer of the machine learning model and (ii) the entire machine learning model. The number of the one or more epochs of the training for the hyperparameter range trials may be predefined. The one or more performance metrics may include one or more of: (i) a training loss metric, (ii) a training accuracy metric, and (iii) a mutual information (MI) metric. Determining the operating range may include: determining a change in value for at least a portion of the performance metrics between at least one of: (i) the one or more epochs of the training and (ii) one of the epochs of training and a default value obtained prior to the training. The one or more performance metrics may be based on a type of machine learning algorithm used for training the machine learning model. The type of the machine learning algorithm may correspond to one or more of: (i) a Stochastic Gradient Descent (SGD) algorithm, (ii) a variant of an SGD algorithm, (iii) a dynamic learning rate using mutual information (DyLR-MI) algorithm, and (iv) a binary exploration (BE) algorithm. Determining the operating range of the hyperparameter may be based on two or more of the recorded performance metrics. Determining the operating range may include: combining the two or more recorded performance metrics into a combined performance metric; and determining the operating range based at least in part on the combined performance metric. Determining the operating range may include: determining an operating range for each of the at least two performance metrics; and combining the at least two determined operating ranges to determine the operating range. The obtained machine learning model may include one of: an untrained machine learning model and a pre-trained machine learning model. The process 300 may include outputting the operating range to an automated model synthesizer. The hyperparameter may include a learning rate hyperparameter.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 4:
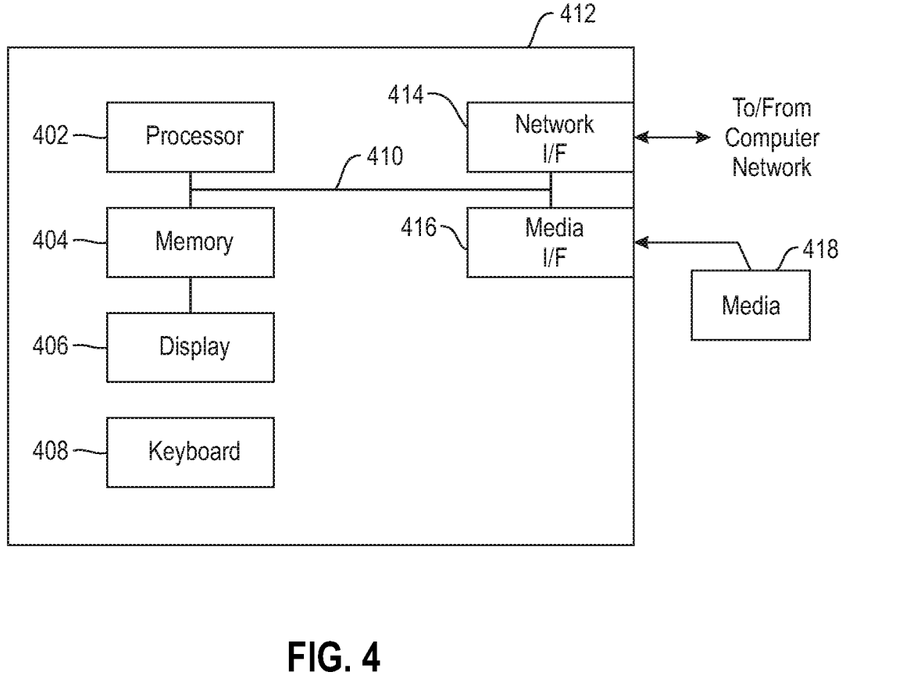
FIG. 4 is a system diagram of an exemplary computer system on which at least one embodiment of the invention can be implemented.

Additionally, an embodiment of the present invention can make use of software running on a computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
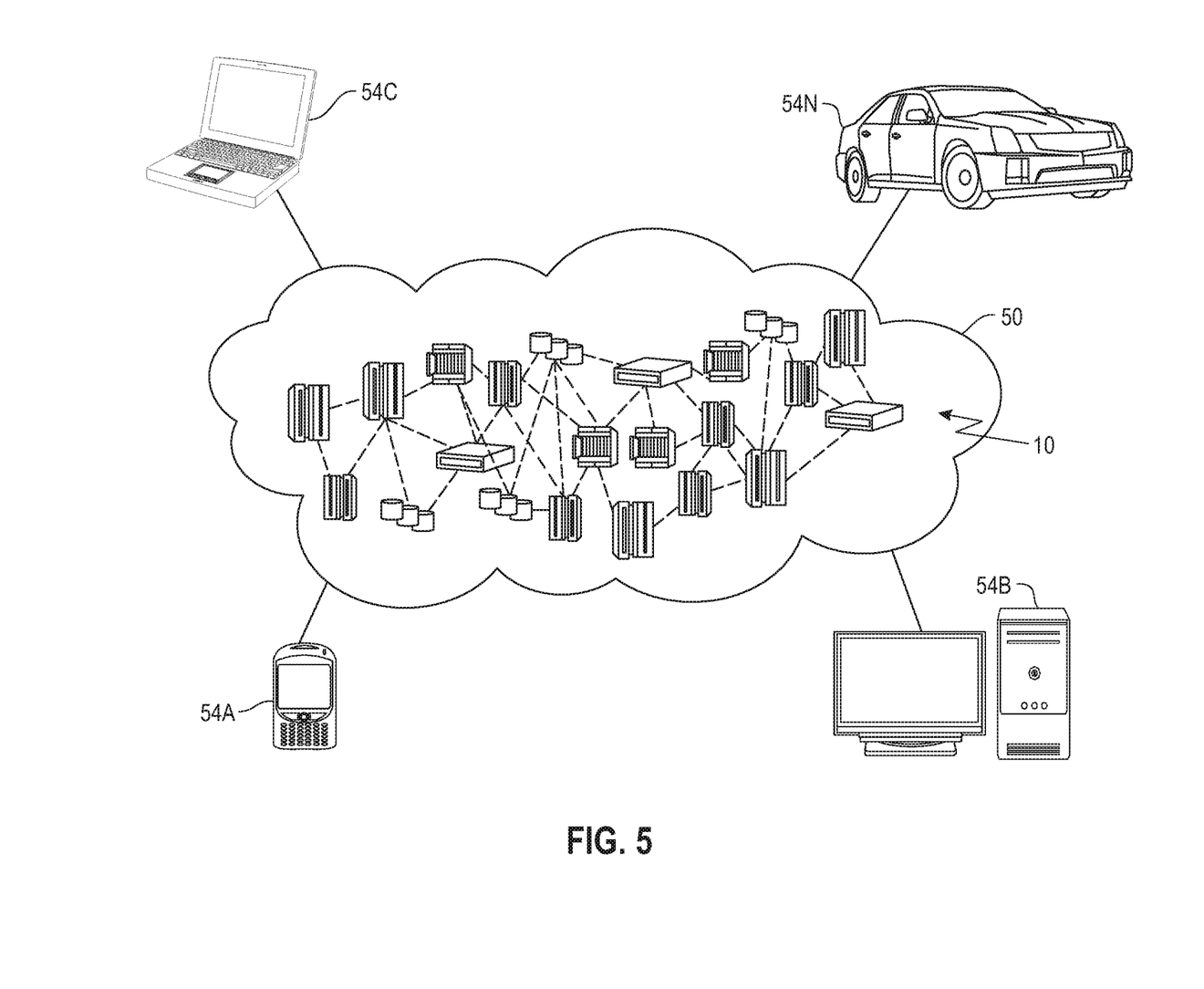
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
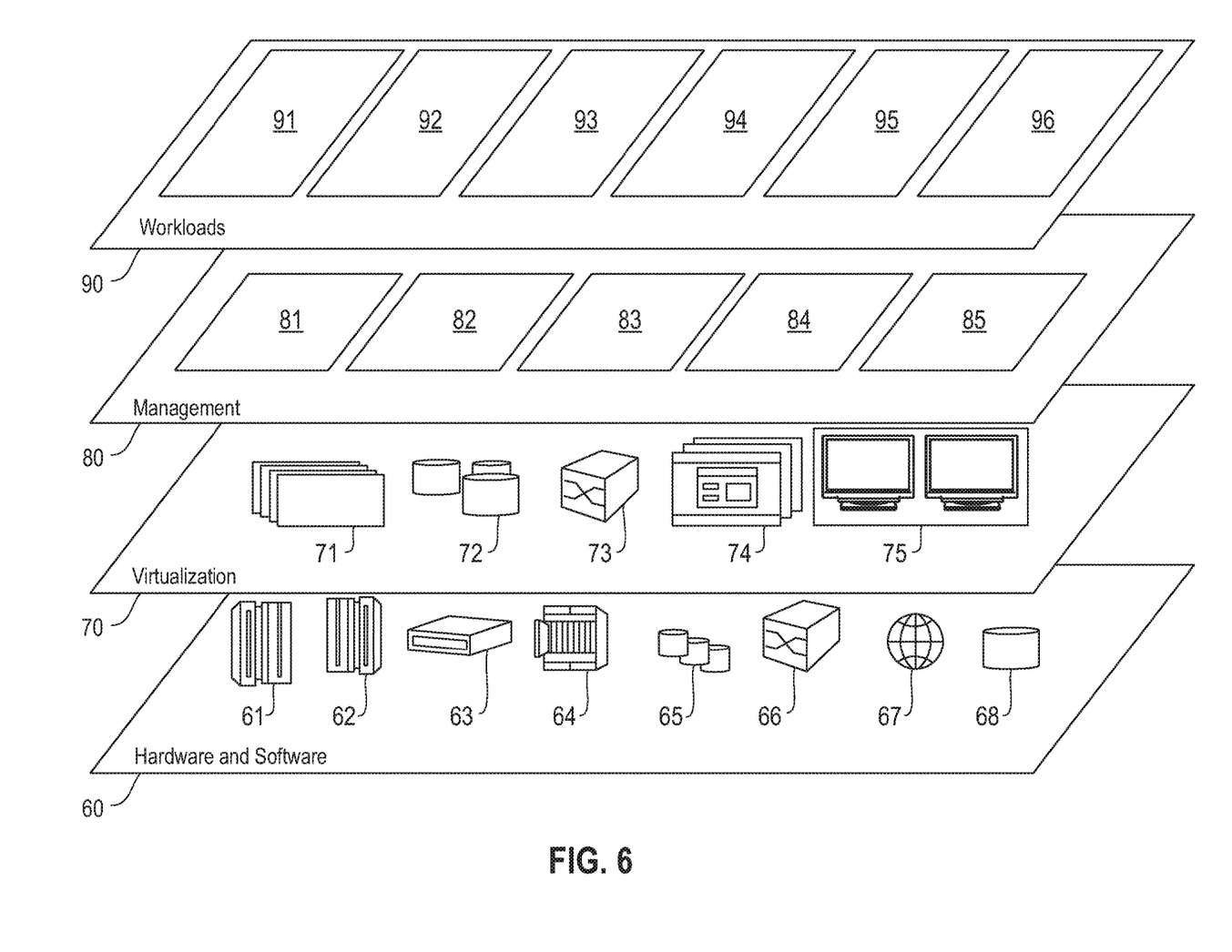
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and determining operating range for a learning rate hyperparameter 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

Without in any way limiting the scope, interpretation, or application of the claims appearing below, a technical effect of one or more of the example embodiments disclosed herein is automatically identifying a learning rate operating range based on one or more performance metrics. Additional technical effects of one or more of the example embodiments include the ability to handle complex models and complex datasets, ensuring a high degree of repeatability of outcomes, the ability to adapt to a wide range of optimization algorithms, and/or the ability to specify a learning rate operating range for individual layers.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
    obtaining (i) a machine learning model, (ii) a list of candidate values for a hyperparameter, and (iii) a dataset;
    performing one or more hyperparameter range trials, wherein performing a given one of said hyperparameter range trials comprises:
        training, based on a given one of said candidate values, the machine learning model for one or more epochs from an initial model state using said dataset;
        when said training is successful for said given candidate value:
            recording one or more performance metrics for each of said one or more epochs of training;
            training, based on one or more additional candidate values in said list, the machine learning model from the same initial model state; and
            recording, in connection with said training based on the one or more additional candidate values, said one or more performance metrics;
    automatically determining, based on said one or more performance metrics from said one or more hyperparameter range trials, an operating range for said hyperparameter; and
    training said machine learning model to convergence based at least in part on said operating range;
    wherein the method is carried out by at least one computing device.

2. The computer-implemented method of claim 1, wherein said performing a given one of the one or more hyperparameter range trials comprises:
    when said training is unsuccessful for the given candidate value:
        causing one or more additional ones of said hyperparameter range trials to be performed until at least one of: (i) a predefined maximum number of hyperparameter range trials are performed and (ii) each candidate value in said list is used to successfully train said machine learning model.

3. The computer implemented method of claim 2, wherein each of the additional hyperparameter range trials is performed starting with the candidate value for which training was unsuccessful in the previous hyperparameter range trial.

4. The computer-implemented method of claim 3, comprising:
    independently determining the initial model state at the start of each of the one or more hyperparameter range trials.

5. The computer-implemented method of claim 1, wherein said operating range corresponds to at least one of: (i) an individual layer of said machine learning model and (ii) the entire machine learning model.

6. The computer-implemented method of claim 1, wherein the number of said one or more epochs of said training for said hyperparameter range trials is predefined.

7. The computer-implemented method of claim 1, wherein said one or more performance metrics comprise one or more of: (i) a training loss metric, (ii) a training accuracy metric, and (iii) a mutual information (MI) metric.

8. The computer-implemented method of claim 1, wherein said determining said operating range comprises:
    determining a change in value for at least a portion of said performance metrics between at least one of: (i) said one or more epochs of said training and (ii) one of said epochs of training and a default value obtained prior to said training.

9. The computer-implemented method of claim 1, wherein the one or more performance metrics are based on a type of machine learning algorithm used for training said machine learning model.

10. The computer-implemented method of claim 9, wherein said type of said machine learning algorithm corresponds to one or more of: (i) a Stochastic Gradient Descent (SGD) algorithm, (ii) a variant of an SGD algorithm, (iii) a dynamic learning rate using mutual information (DyLR-MI) algorithm, and (iv) a binary exploration (BE) algorithm.

11. The computer-implemented method of claim 1, wherein said determining said operating range of said hyperparameter is based on two or more of said recorded performance metrics.

12. The computer-implemented method of claim 11, wherein said determining said operating range comprises:
    combining said two or more recorded performance metrics into a combined performance metric; and
    determining said operating range based at least in part on said combined performance metric.

13. The computer-implemented method of claim 11, wherein said determining said operating range comprises:
    determining an operating range for each of said at least two performance metrics; and
    combining the at least two determined operating ranges to determine said operating range.

14. The computer-implemented method of claim 1, wherein said obtained machine learning model comprises one of:
    an untrained machine learning model and
    a pre-trained machine learning model.

15. The computer-implemented method of claim 1, comprising:
    outputting the operating range to an automated model synthesizer.

16. The computer-implemented method of claim 1, wherein said hyperparameter comprises a learning rate hyperparameter.

17. A computer program product comprising a computer readable storage medium having program instructions embodied therewith, the program instructions executable by a computing device to cause the computing device to:
    obtain (i) a machine learning model, (ii) a list of candidate values for a hyperparameter, and (iii) a dataset;
    perform one or more hyperparameter range trials, wherein performance of a given one of said hyperparameter range trials comprises:
        training, based on a given one of said candidate values, the machine learning model for one or more epochs from an initial model state using said dataset;
        when said training is successful for said given candidate value:

recording one or more performance metrics for each of said one or more epochs of training;

training, based on one or more additional candidate values in said list, the machine learning model from the same initial model state; and recording, in connection with said training based on the one or more additional candidate values, said one or more performance metrics;

automatically determine, based on said one or more performance metrics from said one or more hyperparameter range trials, an operating range for said hyperparameter; and train said machine learning model to convergence based at least in part on said operating range.

18. A computer program product of claim 17, wherein said performance of a given one of the one or more hyperparameter range trials comprises:

when said training is unsuccessful for the given candidate value:

causing one or more additional ones of said hyperparameter range trials to be performed until at least one of: (i) a predefined maximum number of hyperparameter range trials are performed and (ii) each candidate value in said list is used to successfully train said machine learning model.

19. A system comprising:

a memory; and at least one processor operably coupled to the memory and configured for:

obtaining (i) a machine learning model, (ii) a list of candidate values for a hyperparameter, and (iii) a dataset;

performing one or more hyperparameter range trials, wherein performing a given one of said hyperparameter range trials comprises:

training, based on a given one of said candidate values, the machine learning model for one or more epochs from an initial model state using said dataset;

when said training is successful for said given candidate value:

recording one or more performance metrics for each of said one or more epochs of training;

training, based on one or more additional candidate values in said list, the machine learning model from the same initial model state; and recording, in connection with said training based on the one or more additional candidate values, said one or more performance metrics;

automatically determining, based on said one or more performance metrics from said one or more hyperparameter range trials, an operating range for said hyperparameter; and training said machine learning model to convergence based at least in part on said operating range.

20. A computer-implemented method, the method comprising:

obtaining (i) a machine learning model, (ii) a set of candidate values for a learning rate hyperparameter, (iii) a dataset, (iv) a maximum number of trials to be performed for automatically determining an operating range of said learning rate hyperparameter; and (v) a number of epochs;

performing one or more trials to test said set of said candidate values until the earlier of: (i) said maximum number of trials is performed and (ii) each candidate value in said set is successfully tested, wherein each of said one or more trials comprises:

(a) training, using a given candidate value of said set, said machine learning model for said number of epochs from the same initial model state using said dataset, and (b) recording one or more performance metrics between said plurality of epochs of training; and determining, based at least in part on said one or more performance metrics from said one or more trials, said operating range for said learning rate hyperparameter, wherein the method is carried out by at least one computing device.

* * * * *